United States Patent [19]
Head

[11] Patent Number: 5,349,344
[45] Date of Patent: Sep. 20, 1994

[54] APPLIANCE MODE INDENTIFICATION ENCODING

[75] Inventor: Jesse S. Head, Louisville, Ky.

[73] Assignee: General Electric Company, Louisville, Ky.

[21] Appl. No.: 813,573

[22] Filed: Dec. 26, 1991

[51] Int. Cl.⁵ .................. G05B 19/02; H03M 11/00
[52] U.S. Cl. .................. 340/825.23; 340/825.22; 341/26; 364/189
[58] Field of Search .............. 340/825.22, 825.23, 340/825.35, 825.37; 99/325; 219/501, 10.55 B; 364/142, 189, 191; 341/22, 26

[56] References Cited

U.S. PATENT DOCUMENTS

| | | | |
|---|---|---|---|
| 3,622,990 | 11/1971 | Lerch | 340/825.23 |
| 3,947,665 | 3/1976 | Hundley | 340/825.37 |
| 4,279,021 | 7/1981 | See et al. | 341/23 |
| 4,320,386 | 3/1982 | Harris | 340/825.22 |
| 4,400,699 | 8/1983 | Glasmacher | 340/825.22 |
| 4,431,988 | 2/1984 | Molusis et al. | 340/825.22 |
| 4,631,700 | 12/1986 | Lapeyre | 341/23 |
| 4,831,226 | 5/1989 | Robeson et al. | 219/10.55 B |
| 4,841,125 | 6/1989 | Edamura | 219/506 |
| 4,920,948 | 5/1990 | Koether et al. | 126/21 A |
| 5,107,088 | 4/1992 | Aoki | 219/10.55 B |

*Primary Examiner*—John K. Peng
*Assistant Examiner*—Andrew Hill
*Attorney, Agent, or Firm*—H. Neil Houser

[57] ABSTRACT

A microprocesser-based controller for an appliance such as a microwave oven is able to control a number of different models having different cooking characteristics. The user-operable keypanel is unique to each model, and a scanned matrix keyboard on the keypanel is encoded in a manner consistent with conventional scanned matrix keyboard techniques to identify to the controller the particular model. A scanned matrix keyboard includes a set of drive lines and a set of sense lines intersecting the drive lines. In one embodiment disclosed herein, one or more sense lines are added that are uniquely connected to the existing drive lines depending on the particular model being encoded. The added sense lines are read to determine the model. In another embodiment, one or more drive lines are added, similarly connected to existing sense lines depending on the particular model being encoded.

3 Claims, 4 Drawing Sheets

APPLIANCE MODE INDENTIFICATION ENCODING

BACKGROUND OF THE INVENTION

The present invention relates generally to appliance controllers capable of handling a number of different appliance models and, more particularly, to an encoding technique whereby a controller may identify the particular appliance model within which it is installed.

In the manufacture of consumer appliances, such as microwave ovens, it is highly desirable that a single controller, typically microprocessor- or microcontroller-based, be able to handle a variety of different appliance models. Reasons include cost and inventory control. Manufacturing is greatly simplified if only one controller type need be manufactured and stocked, which can then be employed in any model desired. Similarly, subsequent repair is greatly simplified if a service technician can carry with him a single spare controller that will operate in a variety of different models, rather than having to stock or possibly special order a controller for a specific model.

In a given type of appliance such as a microwave oven, the overall control requirements are nearly the same from model to model, but there are a number of differences which require slightly different programming, particularly for certain automatic functions such as "auto cook", "auto roast" and "auto defrost". A number of cooking parameters associated with these functions vary somewhat from model to model, depending upon such factors as microwave cooking cavity size. Thus, a controller may be called upon to operate correctly in different microwave oven chassis having cooking cavities of different sizes, such as 0.8 cubic foot, 1.0 cubic foot and 1.4 cubic feet, as well as different configurations. In addition, each chassis may support a number of different models. Some models may be equipped with such features as temperature probes or humidity sensors for the implementation of more complex cooking algorithms, while other, more basic, models are not. Even where different models employ the same overall cooking algorithms, different data sets for different models may be required, particularly where different chassis are represented.

With the nearly universal use of microprocessor-based controllers, typically the only difference in the controller from one oven model to the next is in the programming stored permanently in read only memory (ROM). It is quite feasible for control programs stored permanently in ROM to include the parameters and instructions appropriate for a variety of oven models. Nevertheless, there remains the problem of identifying to the controller the particular model.

One approach would be to provide a part for each controller, such as a particular printed circuit board (PCB), which is unique to the particular model.

Another approach would be to provide a controller PCB which is modifiable in either the factory or field to encode an identification of the particular model. For example, configuration jumper blocks, other forms of selectable jumpers, or encoding diodes might be provided. One common approach in providing configuration jumpers in general is to initially manufacture a PCB with jumpers or encoding diodes installed in all possible positions such that an installer can simply cut out selected ones to in effect program a particular binary code.

Both of these approaches have drawbacks, however. In either case, extra time is required. Instructions must be provided and maintained, particularly by field service personnel. There is always the possibility of human error, the result of which would not necessarily be readily apparent, since the result may very well be merely a degradation of cooking performance, rather than an obvious failure to work at all.

SUMMARY OF THE INVENTION

Accordingly, it is an object of the invention to provide a technique whereby a controller may identify the appliance model within which it is installed, while avoiding the disadvantages of the approaches described briefly above.

It is another object of the invention to provide such a technique which is entirely automatic in operation such that there is no possibility of human error.

It is yet another object of the invention to provide such a technique which can be implemented with minimal additional cost.

Scanned matrix keyboards are almost universally employed in the control panels of appliances including microcontrollers due to the efficiency of scanned matrix keyboards in minimizing the number of wire connections required. In a scanned matrix keyboard, a set of drive lines and a set of sense lines are logically organized as rows and columns, and each of a plurality of individual key switches is electrically positioned at the intersection between a particular drive line and a particular sense line to electrically connect the particular sense line to the particular drive line when the switch is activated by a user. Conventional practice is to periodically, for example under interrupt control sixty times a second, scan the keyboard by momentarily applying a signal to each of the drive lines in sequence, while monitoring all of the sense lines in synchronism with the activation of the drive lines, and thereby to determine which particular key is being activated.

The scanned keyboard is connected to the controller itself typically through a cable and connector arrangement. As noted above, use of a scanned keyboard minimizes the number of actual conductors required to support a keyboard having a given number of switches.

In overview, the present invention is based on the recognition that an element of an appliance such as a microwave oven which is typically unique from one model to another is the user-operable keypanel. At the very least, the keypanels differ in appearance in order to differentiate among various models. Moreover, in the case of oven models based on different chassis, the physical sizes of the keypanels are different.

In accordance with the invention, the keypanel itself encodes an output to the controller identifying the model. The encoding is done in a manner which is entirely compatible and consistent with the otherwise conventional scanned keyboard implementation.

Briefly, an appliance control system is provided which is automatically adaptable to particular ones of a plurality of appliance models. The control system includes an appliance user control panel unique to a particular one of the plurality of appliance models. The user control panel includes a scanned keyboard which has a set of drive lines and a set of sense lines which logically intersect to define a matrix of intersection points. A plurality of switch elements, such as membrane-type touch switches, are located at corresponding selected ones of the intersection points, with each switch element arranged to selectively electrically connect a particular one of the set of sense lines to a particular one of the set of drive lines when the user actuates the particular switch element. Not every logical intersection point has a switch element.

At least one identification connection element position, and typically a set of identification element positions, is included among the logical intersection points, in particular at logical intersection points where actual user-operable switch elements are not present. Thus each identification connection element position represents a possible electrical connection of a particular one of said set of sense lines to a particular one of set of drive lines. A coding pattern is established, the coding pattern being selected from an encoding set including an identification connection element present at one of the identification connection element positions and including no identification connection element, depending on the particular appliance model. A suitable connector facilitates connection to the drive lines and the sense lines.

The control system additionally includes a controller, such as a microprocessor-based controller, connected to the keyboard drive lines and keyboard sense lines through the connector. The controller includes elements for implementing appliance functions for each of the appliance models and for determining the particular appliance model by applying a signal to at least one of the drive lines, and typically by applying signals to the drive lines individually in a sequence while monitoring the sense lines (or at least one sense line) to recognize the particular ones of the sense and drive lines connected (or which may be connected) by the identification connection element or elements, and thus to recognize the coding pattern.

In one specific embodiment, the scanned keyboard includes a set of drive lines, a set of sense lines, and a plurality of switch elements electrically organized as a matrix, with each switch element arranged to electrically connect a particular one of the set of sense lines to a particular one of the set of drive lines. At least one additional sense line is provided electrically connected to a particular one of the set of drive lines (or to none of the drive lines) depending upon the particular appliance model. Thus a coding pattern is established from an encoding set including a possible electrical connection of the additional sense line to at least a particular one of the set of drive lines and including possibly no electrical connection to the additional sense line, again depending on the particular appliance model. In this embodiment, the controller is connected to the keyboard drive and the sense lines through the connector, and the controller includes elements for determining the particular appliance by applying signals to the drive lines individually in a sequence by monitoring the additional sense line to recognize the particular one of the set of drive lines to which the additional sense line is connected.

BRIEF DESCRIPTION OF THE DRAWINGS

While the novel features of the invention are set forth with particularity in the appended claims, the invention, both as to organization and content, will be better understood and appreciated from the following detailed description, taken in conjunction with the drawings, in which:

DETAILED DESCRIPTION

Figure 1:
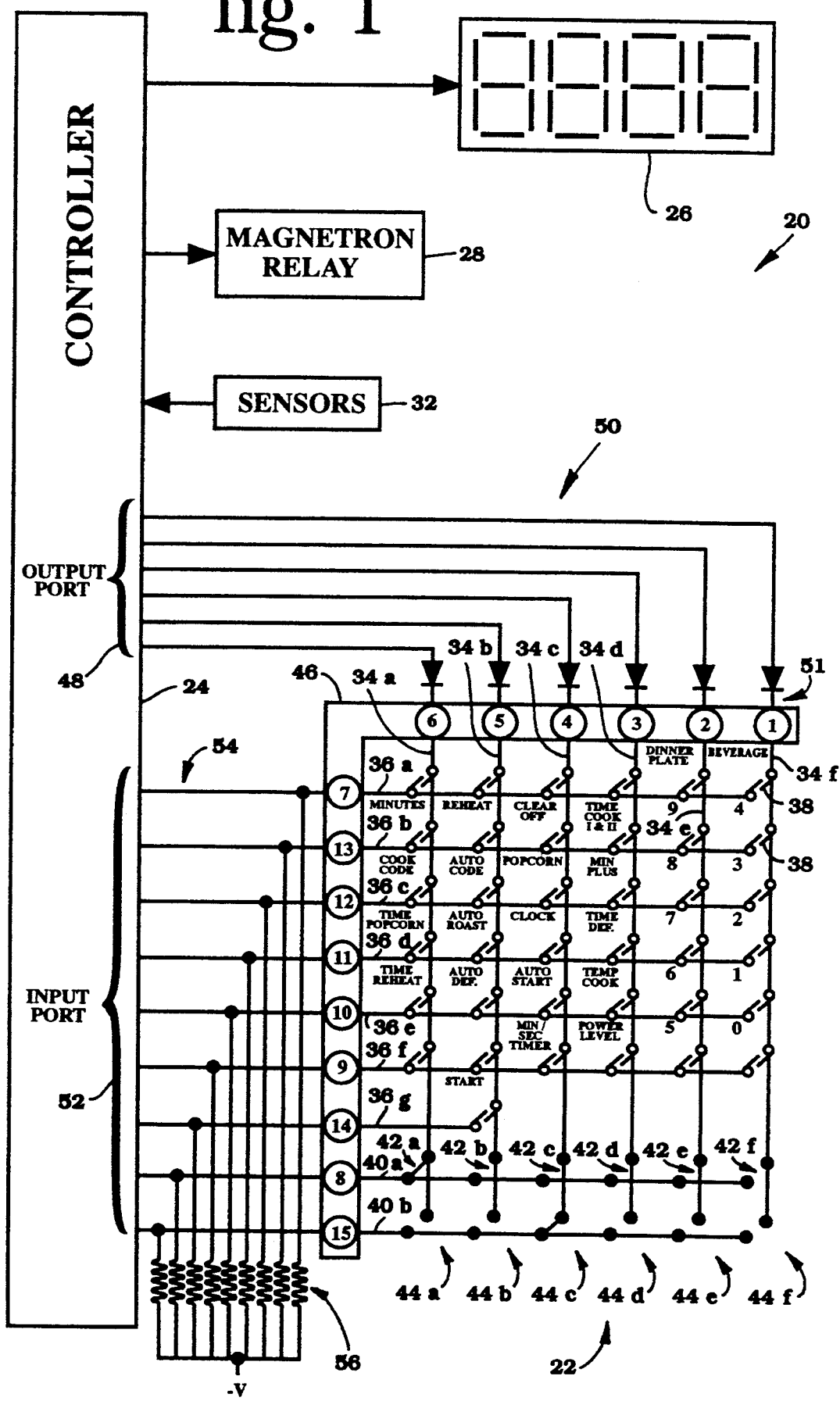
FIG. 1 is an electrical schematic diagram of an appliance control system in accordance with a first embodiment of the invention, incorporating a scanned keyboard.

Referring first to FIG. 1, an appliance control system, generally designated 20, includes an appliance user control panel represented by a scanned keyboard generally designated 22, and a controller 24 in the form of a programmed microcontroller. The controller 24 is connected in conventional fashion to drive a display 26, and to operate a magnetron relay 28 which energizes a magnetron power supply (not shown) at appropriate times. In addition, there may be included one or more sensors, generally designated 32, such as temperature probes, humidity sensors, and door switches connected as inputs to the controller 24.

It will be appreciated that, in overview, the user operates the scanned keyboard 22, and the controller 24 drives the display 26 and causes the magnetron relay 28 to be energized at proper times to effect the desired cooking operation. In addition, inputs from the sensors 32 are taken into account, depending upon the particular cooking operation selected.

Considering the scanned keyboard 22, the keyboard 22 includes a set of drive lines 34a through 34f and a set of sense lines 36a through 36g. A plurality of switch elements 38 are electrically organized as a matrix, with each switch element 38 arranged to selectively electrically connect a particular one of the set of sense lines 36a–36g to a particular one of the set of drive lines 34a–34f. The switch elements 38 may comprise any suitable forth of switch, including discrete mechanical pushbutton switches, membrane-type snap dome switches for tactile feedback, or capacitive touch switches.

In FIG. 1, most of the switch elements 38 are labelled with a particular function identified on the user control panel. It will be appreciated that the particular matrix arrangement for electrical and logical purposes does not necessarily reflect the precise physical arrangement employed, as conductors may be routed to particular switch elements 38 organized variously on the user control panel. In addition, not all possible matrix positions are occupied with an identified switch and, to ensure that sensed operation of the "START" user switch is unambiguous, sense line 36g is connected to the START switch only.

The keyboard 22 includes additional sense lines 40a and 40b which are adapted to be selectively electrically connected to particular ones of the set of drive lines 34a–3.4f, ng pattern depending upon the particular appliance model. Thus, the keyboard 22 includes a set 42a–42f of possible electrical connections between the additional sense line 40a and each of the drive lines 34a–34f, and a set 44a–44f of possible electrical connections between the additional sense line 40b and each of the drive lines 34a–34f. Of the possible connections from the sets 42a–42f, in FIG. 1 there are two actual connections at 42a and 44c. Although drawn schematically as selectable jumpers, it will be appreciated that the potential connections 42a–42f and 44a–44f may very well be permanent parts of the keyboard during manufacture, the keyboard 22 being unique to a particular oven model as discussed hereinabove.

If only one additional sense line 40a is employed, with six drive lines 34a–34f as illustrated, it will be appreciated that seven different appliance models may be encoded. Thus, the additional sense line 40a may be connected to any one of the six drive lines 34a–34f, or to none of the drive lines 34a–34f. The additional sense line 40a cannot be connected to two of the drive lines 34a–34f, because such would constitute a short circuit between the two connected drive lines, rendering the keyboard 22 inoperable.

In cases where a particular controller 24 must operate with a great many different appliance models, more than seven for example, the second sense line 40b is provided, giving the ability to encode a great many different combinations. In a particular configuration illustrated, each of the seven possible positions of the additional sense line 40a (including the possibility of no connection) may be combined with one of seven possible positions of the additional sense line 40g (including the possibility of no connection).

The scanned keyboard 22 may be viewed as a set of drive lines and a set of sense lines which logically intersect to define a matrix of intersection points, with the switch elements 38 located at selected ones of the intersection points, and at least one identification connection element electrically connecting a particular one of the set of sense lines (or potentially connecting) to a particular one of the set of drive lines depending upon the particular appliance model.

For facilitating connection of the controller 24 to the drive lines 34a–34f and the sense lines 36a–36g, as well as the additional sense lines 40a and 40b, a 15-pin connector 46 is provided, of conventional configuration. Typically, the connector 46 is an easily-removable plug-in type connector, although it will be appreciated that other types of connections may be employed, such as direct soldered connections, or various forms of terminal strips.

The controller 24 includes an output port 48 having a set of output lines 50 connected through a set of isolation diodes 51 and through the connector 46 for applying signals to the drive lines 34a–34f in a sequence while monitoring the additional sense lines 40a and 40b to recognize the particular one or ones of the set of drive lines 34a–34f to which the additional sense lines 40a and 40b may be connected.

For actually monitoring the sense lines 36a–36g, 40a and 40b, the controller 24 has an input port 52 with nine input lines 54 connected to the sense lines 36a–36g, 40a and 40b through the connector 46. (As typical microcontroller input ports have only eight input lines, it will be appreciated that the depicted input port 52 is a generalized one for purposes of illustration, and in an actual implementation would comprise eight lines on one physical port and one line on another physical port.) A set of pull-down resistors 56 is connected to the input lines 54, to ensure that the input port 52 does not falsely recognize a signal on one of the input lines 54 when no signal should be present.

During operation, under program control at appropriate times the controller 24 individually energizes the output lines 50 and thus the drive lines 34a–34f, while monitoring the input port 52 in order to recognize status of the keyboard 22.

Figure 2:
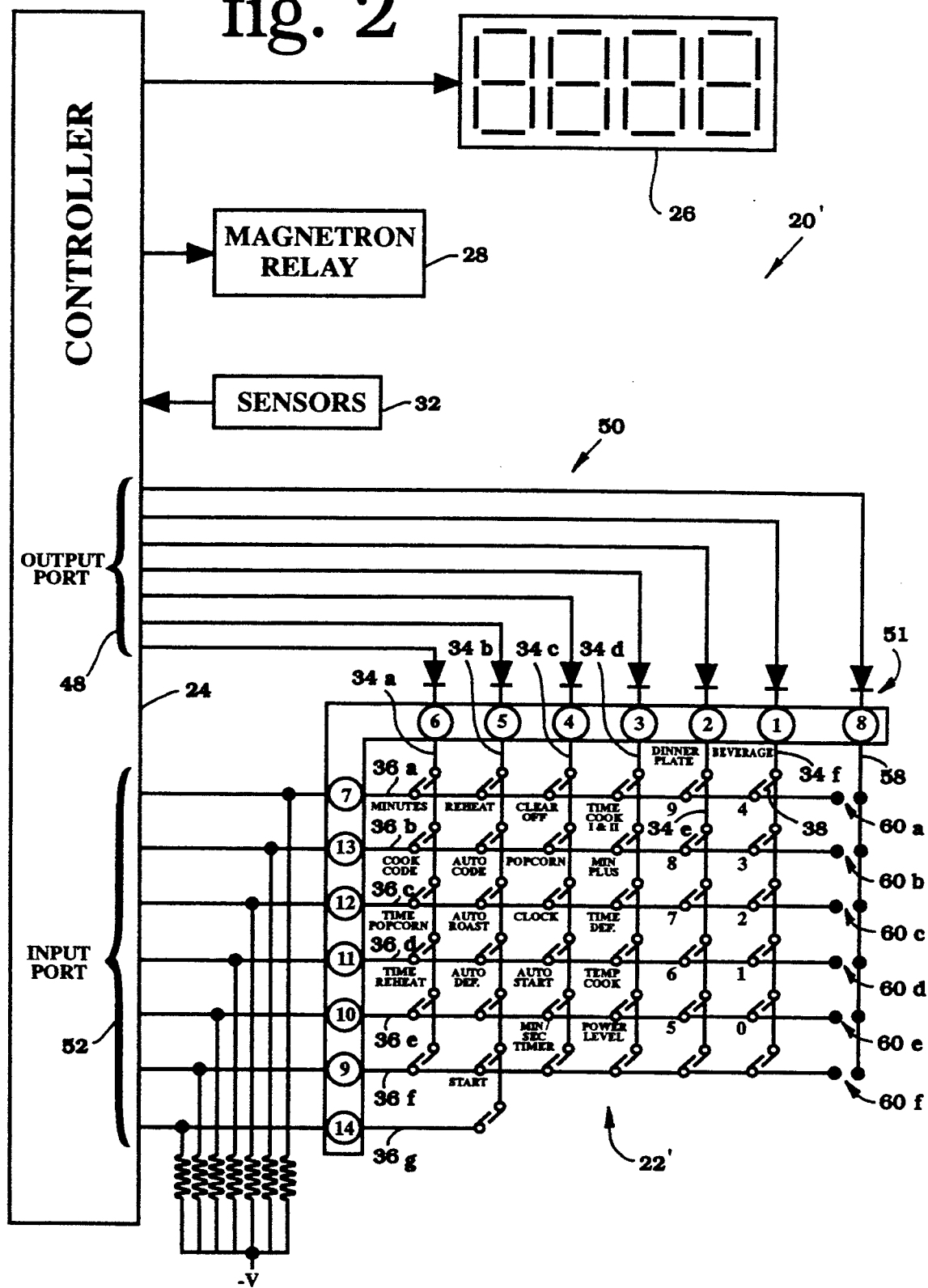
FIG. 2 is an appliance control system in accordance with a second embodiment of the invention, also incorporating a scanned keyboard.

FIG. 2 depicts an equivalent variation of an appliance control system 20' wherein, rather than additional sense lines 40a and 40b as in FIG. 1, a scanned keyboard 22' employs an additional drive line 58 which, to encode an identification of the particular model, may be selectively connected to one of the sense lines 36a–36g by means of a set of possible electrical connections 60a–60f. In FIG. 2, connection 60c is made as an illustrative example. As another example, it may be that none of the possible connections 60a–60f is made. Depending upon the particular. programming, it will be appreciated that the additional drive line 58 may be energized only during those times when it is desired to read the encoded keyboard 22' to determine the oven model, and be left out of the scanning sequence at other times.

Figure 3:
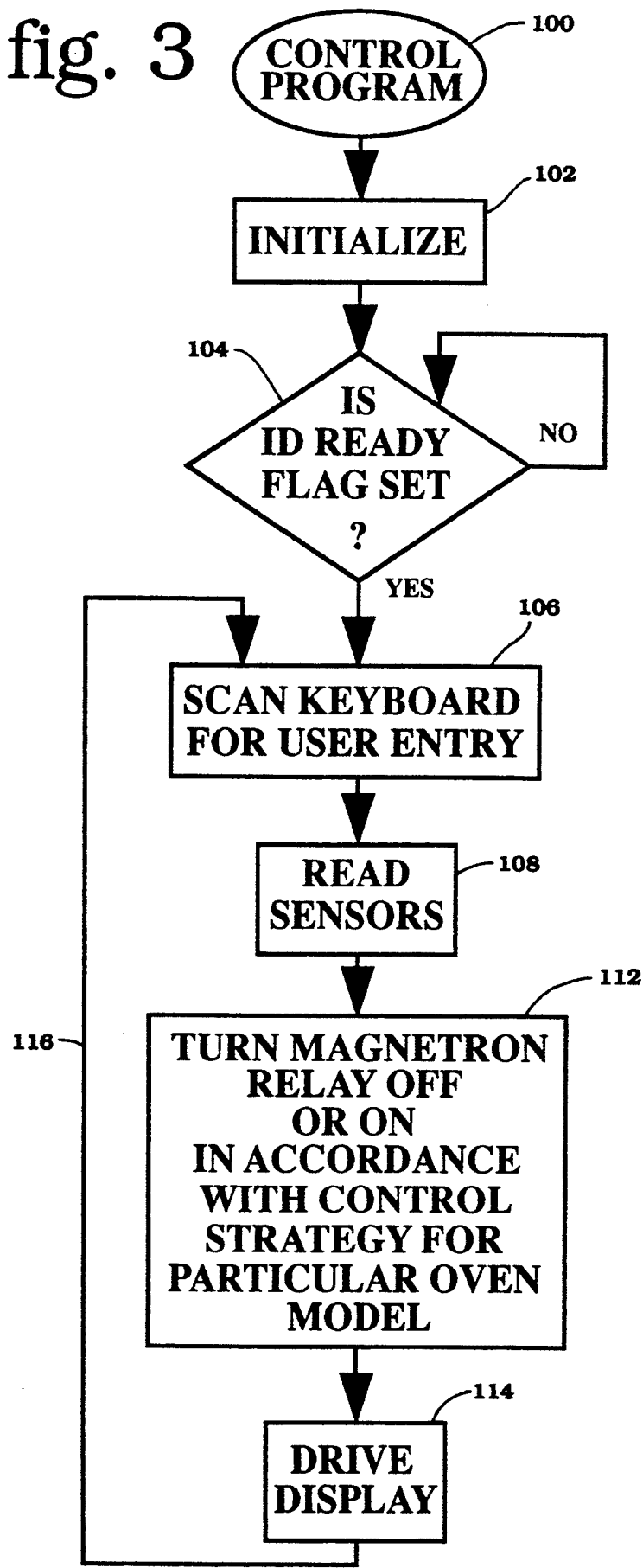
FIG. 3 is a program flowchart representing a control program such as may be employed in a microwave oven controller.

With reference now to FIG. 3, represented in highly general fashion in flowchart form is a control program for operating a microwave oven. It will be appreciated that the FIG. 3 flowchart is conceptual only, as a wide variety of specific programming techniques may be employed, as is well known in the art. In addition, it will be appreciated that typical control programming involves a number of interrupt-driven routines which communicate with each other by means of various flags and variables stored in memory. In the particular representative control program described herein, a single flag variable "ID READY" is relevant, and a single variable "MODEL" is relevant.

The FIG. 3 flowchart is entered at 100, typically upon initial power up. Box 102 represents a number of initializing steps, typical of microcontroller-based control systems.

Step 104 represents a wait loop wherein the "ID READY" flag variable is repetitively examined, until it is set, before operation of the control program continues. In the context of the particular flowchart representation of FIG. 3, it is contemplated that the "ID READY" flag variable is being set by a separate interrupt-driven routine, specifically the FIG. 4 routine described hereinbelow. When the "ID READY" flag variable is set, it means that the identification stored in the variable 37 MODEL" is valid. Until the model identification is valid, the program cannot properly function to direct control functions in accordance with a particular oven model.

Once the model is known, a continuous program loop commences with step 106, wherein the keyboard 22 is scanned for user entry, in a conventional manner. Next, in step 108 any sensors are read.

In step 112 the magnetron relay 28 is turned OFF or ON (or left unchanged) in accordance with the particular control strategy being implemented.

In step 114, the user display 26 is updated, and the program loops back to step 106 as indicated by line 116.

It will be appreciated that the particular sequence of steps in FIG. 3 is entirely arbitrary and non-critical and, as noted above, the various operations may in effect proceed concurrently where each is a separate interrupt-driven routine in accordance with conventional real time controller programming techniques.

Figure 4:
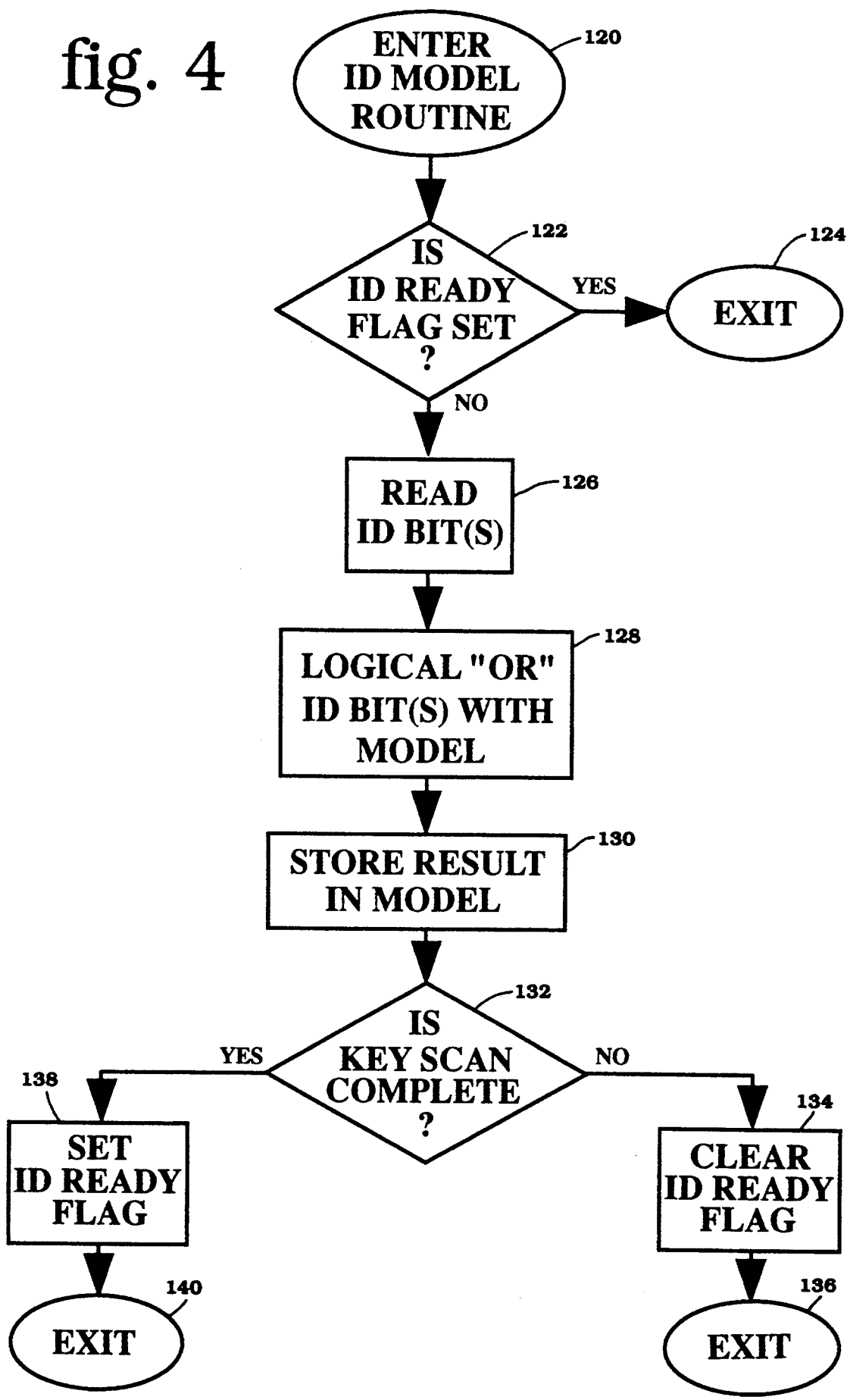
FIG. 4 is a program flowchart of a routine for identifying a particular model based on an encoded keyboard.

Referring finally to FIG. 4, an ID_MODEL routine is entered at step 120, either as an in-line routine, perhaps as part of an initializing sequence, or as an interrupt driven routine.

In step 122, the ID READY flag variable is examined to determine whether it has already been set. If so, then the routine exits at 124.

Otherwise, step 126 is entered whereupon I.D. bits are read as part of a keyboard scan in order to determine the model I.D. which has been encoded as part of the keyboard. Depending upon a particular programming logic employed, the variable "MODEL" is built up such as by successive logical OR operations in step 128, with the final result then stored in the variable "MODEL" in step 130.

In the event the FIG. 4 routine is an interrupt-driven routine which successively executes during periods when different ones of the drive lines 34a–34f are driven, it may take a number of passes through the FIG. 4 routine before all bits of the model identification have been read, and a valid result stored in the variable "MODEL". Accordingly, in a representative decision step 132 it is determined whether the key scan is complete. If not, box 134 is entered, and the "ID READY" flag variable remains clear, and the program exits at 136 to be subsequently re-entered. If the key scan is complete, then step 138 is entered, and the "ID READY" flag variable is set to be subsequently sensed in step 104 of FIG. 3, and the FIG. 4 routine exits at 140, likely not to be executed again until the next time the appliance is turned on.

At this point, the variable "MODEL" holds a value indicating to the overall controller routine represented in FIG. 3 the particular model. Various program steps represented in FIG. 3 can thereafter make proper decisions in those circumstances where the particular model is relevant.

While specific embodiments of the invention have been illustrated and described herein, it is realized that numerous modifications and changes will occur to those skilled in the art. It is therefore to be understood that the appended claims are intended to cover all such modifications and the changes as fall within the true spirit and scope of the invention.

What is claimed is:

1. An appliance control system which is automatically adaptable to particular ones of a plurality of appliance models, said control system comprising:
   an appliance user control panel unique to a particular one of the plurality of appliance models, said user control panel including a scanned keyboard having:
      a set of drive lines,
      a set of sense lines,
      a plurality of switch elements electrically organized as a matrix, each switch element arranged to selectively electrically connect a particular one of said set of sense lines to a particular one of said set of drive lines,
      at least one additional sense line establishing a coding selected from an encoding set including a possible electrical connection of said additional sense line to a particular one of said set of drive lines and including possibly no electrical connection of said additional sense line to any of said set of drive lines, depending on the particular appliance model, and
      a connector facilitating connection to said drive lines and said sense lines; and
   a controller connected to said keyboard drive limes and sense lines through said connector, said controller including elements for implementing appliance functions for each of the plurality of appliance models and for determining the particular appliance model by applying signals to at least one of said drive lines while monitoring said at least one additional sense line to recognize the coding indicating the particular appliance model.

2. An appliance control system in accordance with claim 1, wherein said scanned keyboard has at least a pair of additional sense lines establishing a coding selected from an encoding set including a possible electrical connection of each of said additional sense lines on an individual basis to a particular one of said set of drive lines and including possibly no electrical connection of said additional sense lines on an individual basis to any of said set of drive lines, depending on the particular appliance model.

3. An appliance control system which is automatically adaptable to particular ones of a plurality of appliance models, said control system comprising:
   an appliance user control panel unique to a particular one of the plurality of appliance models, said user control panel including a scanned keyboard having:
      a set of drive lines and a set of sense lines, said drive lines and said sense lines logically intersecting to define a matrix of intersection points,
      a plurality of switch elements located at corresponding selected ones of said set intersection points, each switch element arranged to selectively electrically connect a particular one of said set of sense lines to a particular one of said set of drive lines,
      at least one identification connection element position representing a possible electrical connection of a particular one of said set of sense lines to a particular one of said set of drive lines, and an established coding selected from an encoding set including an identification connection element present at said at least one identification connection element position and including no identification connection element present at said at least one identification connection element position, depending on the particular appliance model, and
      a connector facilitating connection to said drive lines and said sense lines; and
   a controller connected to said keyboard drive lines and sense lines through said connector, said controller including elements for implementing appliance functions for each of the appliance models and for determining the particular appliance model by applying a signal to at least one of said drive lines while monitoring at least one of said sense lines to recognize the established coding indicating the particular appliance model.

* * * * *